United States Patent [19]

Kervagoret

[11] Patent Number: 4,783,965

[45] Date of Patent: Nov. 15, 1988

[54] HYDRAULIC BOOSTER

[75] Inventor: Gilbert Kervagoret, Argenteuil, France

[73] Assignee: Bendix France, Drancy, France

[21] Appl. No.: 4,717

[22] Filed: Jan. 20, 1987

[30] Foreign Application Priority Data

Jan. 22, 1986 [FR] France .................. 86 00883

[51] Int. Cl.$^4$ ............................................. B60T 11/20
[52] U.S. Cl. ...................................... 60/562; 60/563; 60/566; 60/582
[58] Field of Search ................ 60/562, 563, 565, 566, 60/582

[56] References Cited

U.S. PATENT DOCUMENTS

| | | | |
|---|---|---|---|
| 3,729,235 | 4/1973 | Bach et al. | 303/21 F |
| 4,015,881 | 4/1977 | Adachi | 60/581 |
| 4,232,520 | 11/1980 | Harries | 60/581 |
| 4,405,183 | 9/1983 | Resch | 60/563 |
| 4,449,369 | 5/1984 | Dauvergne | 60/563 |
| 4,604,870 | 8/1986 | Bach | 60/581 |
| 4,651,528 | 3/1987 | Carré | 60/563 |
| 4,709,550 | 12/1987 | Sauvée | 60/562 |

FOREIGN PATENT DOCUMENTS

| | | |
|---|---|---|
| 0151069 | 8/1985 | European Pat. Off. . |
| 2418489 | 11/1964 | Fed. Rep. of Germany . |
| 2307817 | 8/1974 | Fed. Rep. of Germany . |
| 3015689 | 10/1981 | Fed. Rep. of Germany ........ 60/582 |
| 2565186 | 5/1985 | France . |

Primary Examiner—Abraham Hershkovitz
Attorney, Agent, or Firm—Larry J. Palguta; Ken C. Decker

[57] ABSTRACT

Hydraulic booster comprising a housing provided with a bore inside which there is slidably mounted two pistons each associated with a respective pressure chamber intended to be connected to a respective brake circuit; an actuating piston slidably mounted inside the bore and intended to be displaced by a brake pedal, displacement of the actuating piston being capable of causing displacement of the two pistons; and two valve mechanisms each associated with a respective brake circuit and intended to control the flow of pressurized fluid from a respective source to the brake circuit, characterized in that the two valve mechanisms are arranged parallel to the bore and are intended to be actuated simultaneously by the actuating piston.

5 Claims, 1 Drawing Sheet

U.S. Patent   Nov. 15, 1988   4,783,965
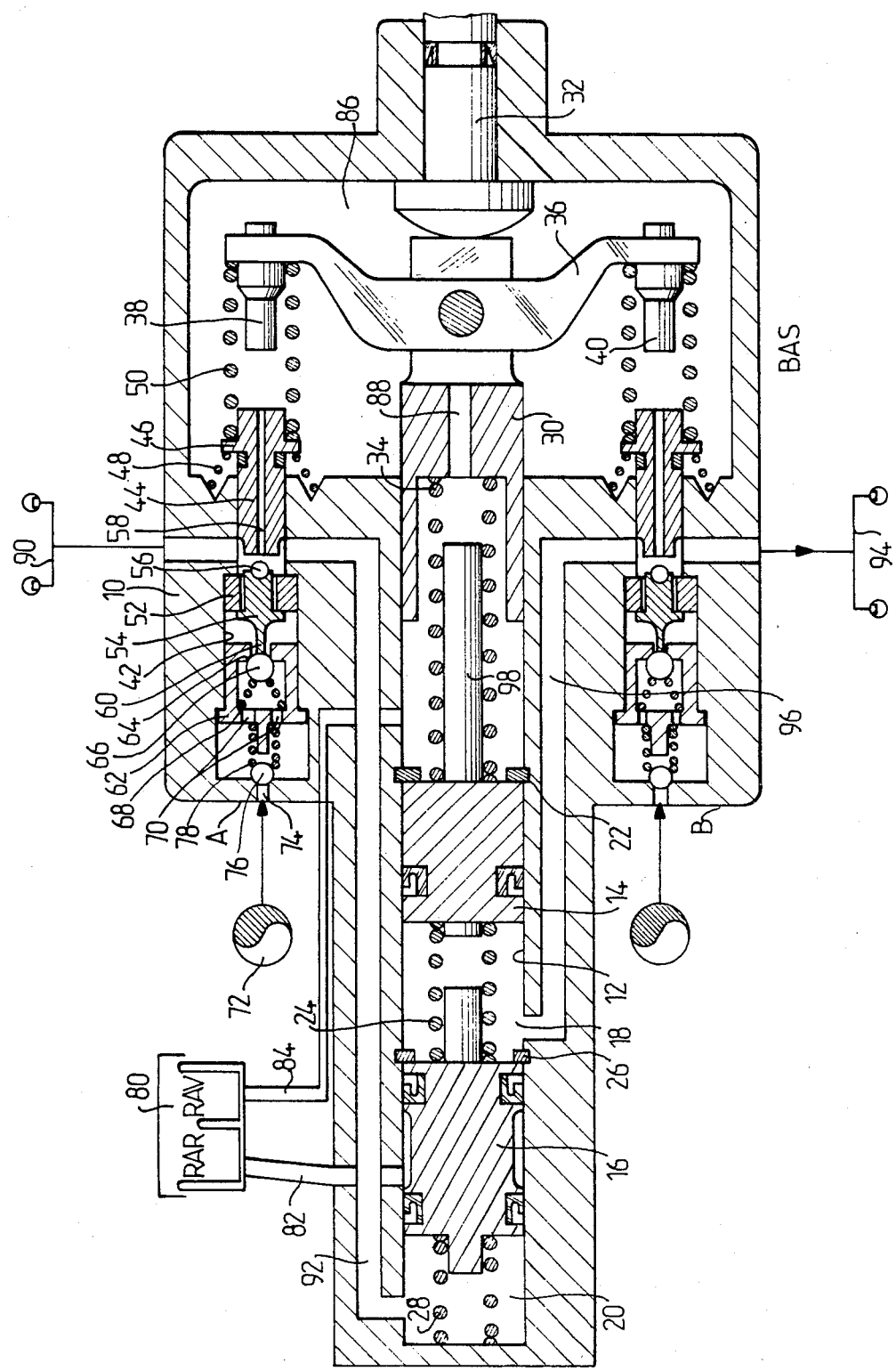

HYDRAULIC BOOSTER

The present invention relates to hydraulic boosters and more particularly to such a booster for a dual brake circuit operating both hydrodynamically (more commonly known as full-power operation) and hydrostatically.

The French patent application No. 84/01439 discloses a mixed-operation hydraulic booster for a vehicle brake circuit, comprising a housing inside which two pistons slide, in line, each associated with a respective pressure chamber and displaceable together by a brake pedal. Each piston has a valve means intended to control the brakes of the vehicle. In the case of failure of the high-pressure source, the booster is capable of operating hydrostatically as a conventional master cylinder.

However, despite its advantages, this booster has slight drawbacks in that the complicated structure of the pistons and their respective valves makes the manufacture and assembly of the booster complex and costly.

It is therefore an aim of the present invention to provide a hydraulic booster of the full-power type capable of operating as a normal master cylinder in the event of failure in the high-pressure circuit, in accordance with an arrangement which offers a simple design, greater reliability and low manufacturing and assembly costs.

According to the present invention there is provided a hydraulic booster comprising a housing provided with a bore inside which there are slidably mounted two pistons each associated with a respective pressure chamber intended to be connected to a respective brake circuit; an actuating piston slidably mounted inside the bore and intended to be displaced by a brake pedal, displacement of the actuating piston being capable of causing displacement of the two pistons; and two valve means each associated with a respective brake circuit and intended to control the flow of pressurized fluid from a respective source to the brake circuit, characterized in that the two valve means are arranged parallel to the bore and are intended to be actuated simultaneously by the actuating piston.

The invention will now be described by way of example with reference to the accompanying drawings in which:

the sole FIGURE is a longitudinal section of a hydraulic booster according to the invention.

In the embodiment shown, a hydraulic booster comprises essentially a housing 10 with a bore 12 inside which there is slidably mounted a first and a second piston 14, 16 arranged in tandem and defining between them a first pressure chamber 18. A second pressure chamber 20 is defined between the second piston 16 and the end of the bore 12. The first piston 14 is biased by a spring 24 towards its rest position shown in the drawing, up against a circlip 22 fixedly mounted inside the bore 12. Similarly, the second piston 16 is biased up against a circlip 26 by a spring 28.

An actuating piston 30 is slidably mounted inside the bore 12 and is capable of being displaced by a push-rod 32 connected to a brake pedal (not shown) of a vehicle. The actuating piston 30 is connected to the first piston 14 by a spring 34. A compensator 36 having at each end a rod 38, 40 is pivotably mounted on the end of the actuating piston 30.

The booster has, in addition, two hydraulic distributor valves A and B associated with the rear and the front brakes of the vehicle, respectively. Since the two distributor valves A, B are substantially indentical, only the distributor valve A will be described in detail. Inside the housing 10 there is formed, parallel to the bore 12, a stepped bore 42 inside which there is sealingly and slidably mounted an actuating member 44 with a collar 46 against which two springs bear, one spring 48 biasing the actuating member 44 to the right (when viewing the drawings) and another spring 50 connecting the actuating member 44 to the compensator 36. An annular member 52 is fixedly mounted inside the bore 42 and slidably supports the thrust member 54 which has, at its end close to the actuating member 44, a ball 56 capable of closing a longitudinal bore 58 formed in the actuating member 44. At its other end the thrust member 54 has a pin 60. Inside the bore 42 there is also mounted a valve means 62 having at one end an orifice 64 forming a seat for a ball valve 66. The ball 66 is biased towards its closed position against the seat 66 by a spring 68. At its other end the valve means 62 has two openings 70. The stepped bore 42 is intended to be connected to a source 72 of pressurized hydraulic fluid via an orifice 74 capable of being closed by a ball 76 biased towards its closed position by a spring 78.

The booster comprises a low-pressure reservoir 80 connected to the bore 12 in the region of the second piston 16 by a pipe 82, and to the bore 12 between the first piston 14 and the actuating piston 30 by a pipe 84. A chamber 86 containing the compensator 36 is connected to the bore 12 by a passage 88 inside the actuating piston 30.

The second pressure chamber 20 is connected to a first brake circuit 90, for example the rear brakes of the vehicle, by a passage 92 communicating with the stepped bore 42. Similarly, the first pressure chamber 18 is connected to a second brake circuit 94, for example the front brakes of the vehicle, by a passage 96 communicating with the stepped bore of the distributor valve B.

The mode of operation of the booster thus described is as follows. A force, applied by the brake pedal to the push-rod 32, displaces the actuating piston 30 to the left (when viewing the drawings), the force called "pedal senstation" being ensured by the springs 34, 48, 50. Displacement of the actuating piston 30, and hence of the compensator 36, causes displacement of the actuating members 44 of the two distributor valves A and B by means of the springs 50 and closure of the bores 58 by the balls 56. Each bore 42 is thus isolated from the chamber 86. If displacement of the push-rod 32 continues, each assembly consisting of the actuating member 44 and thrust member 54 is displaced to the left, opening the respective ball valve 66 and allowing the pressurized fluid to pass from the sources 72 to the brakes 90, 94.

When the brakes are released, the actuating piston 30 and the actuating members 44 are biased towards their rest positions by the springs 34, 48 and 50. The balls 56 opening the bores 58 allow the pressurized fluid to pass through the chamber 86, the passage 88 and the pipe 84 towards the low-pressure reservoir 80.

In the event of failure of the high-pressure source of the distributor valve A of the rear brake circuit, the ball 76 closes the orifice 74 owing to the action of the spring 78, thus isolating the bore 42. During braking, the pressure of the source of the distributor valve B of the front brake circuit is transmitted, via the passage 96, to the chamber 18, causing assisted displacement of the piston 16. The two circuits therefore receive an assisted braking pressure.

In the event of failure of the high-pressure source of the distributor valve B of the front brake circuit, the ball 76 performs a closing action as described above. During braking, the circuit 90 of the rear brakes receives a normal assisted hydraulic pressure. The actuating piston 30 bears against a rod 98 integral with the first piston 14, displacing the latter according to the displacement of the push-rod 32. The chamber 18 thus becomes a hydrostatic pressure chamber of a conventional master cylinder. The travel of the brake pedal, in this case, is extended.

In the event of failure of both the high-pressure sources of the distributor valves A and B, the two ball valves 76 close and the booster is transformed into a conventional tandem master cylinder, each chamber 18, 20 becoming a hydrostatic pressure chamber.

I claim:

1. A full power hydraulic booster comprising a housing provided with a bore inside which is slidably mounted two pistons each associated with a respective pressure chamber connected to a respective brake circuit, an actuating piston mounted slidably inside the bore and displaceable by a brake pedal, displacement of the actuating piston causing displacement of the two pistons, and two valve means each associated with a respective brake circuit and controlling the flow of pressurized fluid from a respective pressurized fluid source to the associated brake circuit, characterized in that the two valve means are arranged parallel to the bore and are actuated simultaneously by the actuating piston, the pressurized fluid from the sources normally being communicated separately of the two pistonss and directly, via the two valve means, to the respective brake circuits, a failure of one fluid source resulting in the other fluid source providing pressurized fluid assisted displacement of one of the pistons which displaced fluid from the housing to the brake circuit associated with the one fluid source, failure of the other fluid source resulting in the other piston being displaced by means of the actuating piston so that the other piston displaces hydrostatic fluid pressure to the brake circuit associated with the other fluid source, the housing comprising a passage communicating the pressure chamber associated with the one piston with the associated brake circuit via a communication with one of the valve means, and a passage communicating the pressure chamber associated with the other piston with the associated brake circuit via a communication with the other of the valve means.

2. The booster in accordance with claim 1, characterized in that the booster comprises a compensator mounted pivotably on the actuating piston and which actuates the two valve means.

3. The booster in accordance with claim 1, characterized in that the compensator has two ends, each end being associated with a respective valve means, and comprising two springs, one spring situated between each end of the compensator and actuating means associated therewith.

4. The booster in accordance with claim 3, characterized in that one of the pressure chambers is defined between the one piston and one end of the bore and the other pressure chamber is defined between the two pistons.

5. The booster in accordance with claim 3, characterized in that the booster comprises a third chamber inside the housing and the third chamber connected, in a rest position of the booster, to the brake circuits and to a low pressure reservoir, and inside the third chamber is disposed one end of the actuating piston and the compensator.

* * * * *